United States Patent
Lee

[11] Patent Number: 5,896,744
[45] Date of Patent: Apr. 27, 1999

[54] COMPULSORY DISCHARGING DEVICE FOR EXHAUST OF VEHICLE

[76] Inventor: Yuan-Tien Lee, No. 2, Alley 2, Lane 173 Ming-An West Road, Hsinchuang, Taipei Hsien, Taiwan

[21] Appl. No.: 09/001,879

[22] Filed: Dec. 31, 1997

[51] Int. Cl.$^6$ ............................... F02B 35/00; F01N 3/02
[52] U.S. Cl. ................................................. 60/315; 60/317
[58] Field of Search .............................. 60/315, 317, 319, 60/290

[56] References Cited

U.S. PATENT DOCUMENTS

| | | | |
|---|---|---|---|
| 2,402,087 | 6/1946 | Rosales | 60/317 X |
| 3,393,668 | 7/1968 | Milgram | 60/315 X |
| 3,666,422 | 5/1972 | Rossel | 60/315 X |
| 5,012,641 | 5/1991 | Travalee | 60/315 X |

FOREIGN PATENT DOCUMENTS

| | | | |
|---|---|---|---|
| 3218074 | 11/1983 | Germany | 60/315 |
| 56-32023 | 4/1991 | Japan | 60/315 |

*Primary Examiner*—John E. Ryznic
*Attorney, Agent, or Firm*—Dougherty & Troxell

[57] ABSTRACT

The present invention relates to a compulsory discharging device for exhaust of vehicle of the type in which a driving motor which has a propeller is mounted at the end portion of the exhaust pipe such that the exhaust within said exhaust pipe can be compulsorily discharged. The operation of the driving motor is controlled by a digital controller which uses a signal line to pick up the frequency of a high voltage line of an igniting coil. The rpm of said driving motor can be proportionally controlled with respect to the rpm of the engine. The output shaft of the driving motor is coaxially mounted with a propeller and a mixing propeller with which the exhaust can be mixed with fresh air to reduce the concentration of the exhaust. Then the diluted exhaust is discharged. The exhaust generated from the combustion within the cylinder can be effectively and completely withdrawn such that the performance of the engine can be increased. The residue of carbon is reduced and the power of the engine is increased.

4 Claims, 3 Drawing Sheets

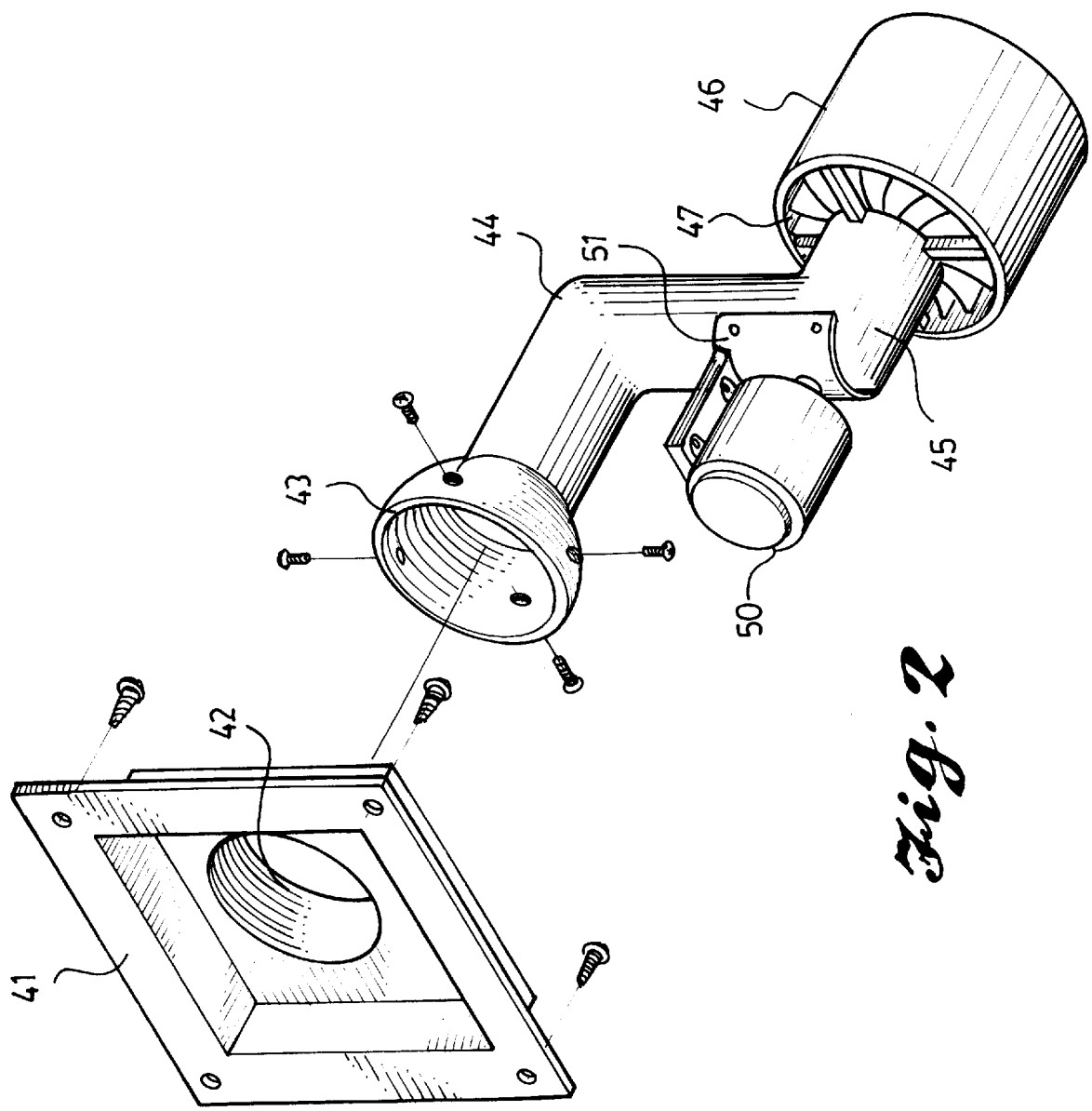

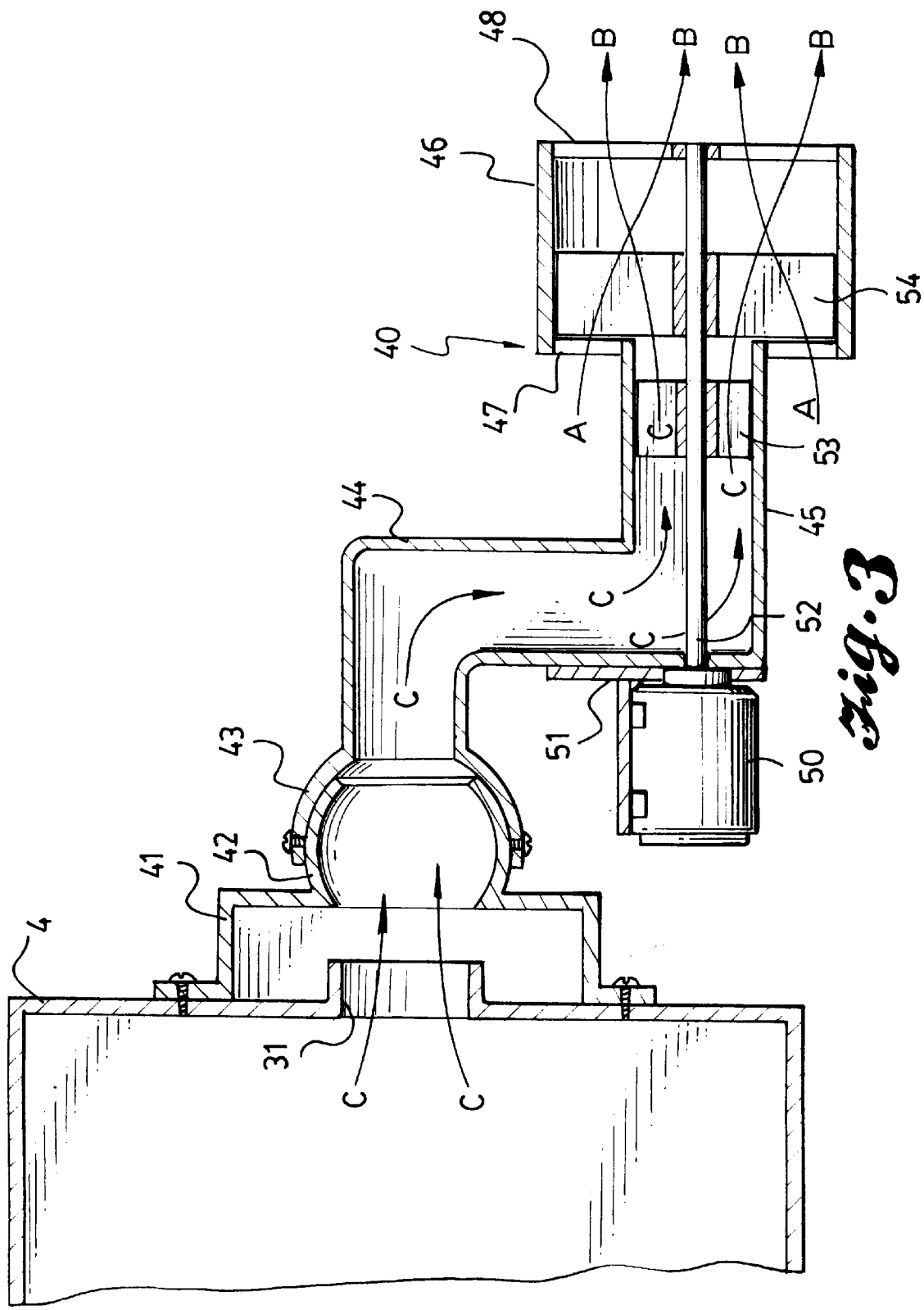

5,896,744

COMPULSORY DISCHARGING DEVICE FOR EXHAUST OF VEHICLE

FIELD OF THE INVENTION

The present invention relates to a discharging device, more particularly, to a compulsory discharging device for exhaust of vehicle. The discharging device comprises a fan and a driving motor and which is disposed at the outlet of the exhaust pipe. The rpm of the fan is controlled by a digital controller which controls the rpm of the fan proportional to the triggering of the igniting coil. By this arrangement, the exhaust from the engine can be effectively withdrawn such that the engine can be benefited with a smooth operation, complete combustion and lower deposit of carbon. Consequently, the pollution from the exhaust can be reduced.

DESCRIPTION OF PRIOR ART

Engine is a power generating device in which mixture of fuel and air is cyclically ignited by the spark. The cylinders of the engine serve as the combusting chamber and the piston will be pushed outward from the cylinder by the combustion of the mixture. Since a crankshaft is rotationally connected to the lower end of each of the pistons, as the piston is pushed downward, the rotational inertial of the crankshaft will move the piston upward. When the piston is moved up again, the combusted mixture or exhaust is expelled out from the cylinder when a valve is opened. However, the exhaust within the cylinder can not be completely expelled by the upward movement of the piston and there is a residue within the cylinder and mixed with the mixture which is drawn in by the downward movement of the piston. As the exhaust is mixed with the newly arrived mixture, the combustion will become poor and the power generated therefrom is also reduced. Furthermore, the carbon will be accumulated within the cylinder will be negatively influence the operation of the engine.

In order to reduce the carbon monoxide, the exhausting pipe is installed with a catalytic converter which is made from porous ceramic material. The carbon monoxide will be further oxidized into the carbon dioxide by the high heat of the catalytic converter. As a result, the exhaust become more and more cleaner.

However, as the catalytic converter is installed within the exhaust pipe, the exhaust will be slowed down accordingly. As a result, the deposit of carbon within the cylinder will be deteriorated. As a result, the engine is operated under the incomplete combustion and the power generated therefrom will be also reduced. As the deposit of carbon can not be reduced and the unwanted wearing between the piston and the cylinder is increased, the service life of the engine will be reduced.

SUMMARY OF THE INVENTION

It is the objective of this invention to provide a compulsory discharging device with which the exhaust from the engine can be effectively expelled.

It is still the objective of this invention to provide a compulsory discharging device which is installed at the end portion of the exhaust pipe. When the exhaust within the exhaust pipe is forcibly drawn out by the discharging device, a negative pressure condition will be established within the exhaust pipe such that the exhaust within the cylinder will be expelled and drawn completely by the negative pressure within the exhaust pipe. While the exhaust is completely expelled from the cylinder, this is beneficial to the combustion of the mixture and the deposit of carbon can be therefore reduced. By this arrangement, the performance of the engine as well as the service life are both increased. Besides, the power is also increased.

It is still the objective of this invention to provide a discharging device with which the slow down of the exhaust cause by the installation of the catalytic converter or muffler can be prevented. By the provision of the discharging device, the exhaust can be completely discharged from the exhaust pipe and the catalytic converter can be prevented from being damaged.

BRIEF DESCRIPTION OF DRAWINGS

In order that the present invention may more readily be understood the following description is given, merely by way of example with reference to the accompanying drawings, in which:

FIG. 2 is a perspective view of the discharging device made according to the present invention; and FIG. 3 is a cross sectional view of the discharging device shown in FIG. 2.

DETAILED DESCRIPTION OF PREFERRED EMBODIMENTS

Figure 1:
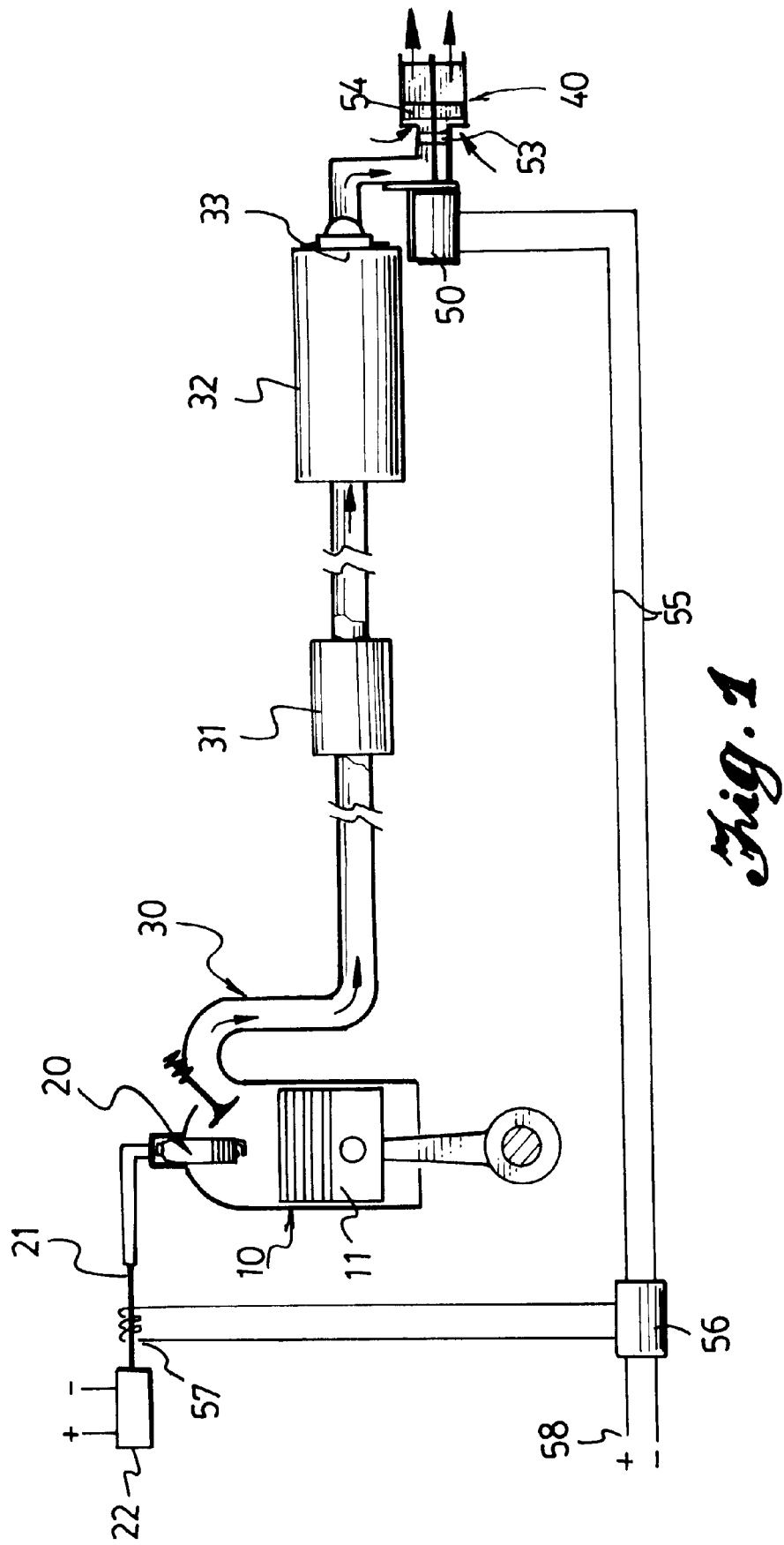
FIG. 1 is a layout of the discharging device made according to the present invention.

Referring to FIG. 1, the compulsory discharging device for the exhaust of the vehicle is provided with a composite outlet 40 at the outlet 33 of the exhaust pipe 30. The composite outlet 40 generally includes a driving motor 50 and a propeller 53 and mixing propeller 54 for withdrawing the exhaust which are coaxially mounted at the output shaft of the driving motor 50. The driving motor 50 is powered by the battery which provides current 58 to the driving motor 50. This current 58 is calibrated by a digital controller 56 for controlling the rpm of the driving motor 50. The digital controller 56 is wound onto the high voltage line 21 of the igniting coil 22 by means of a signal coil 57. The working principle of the discharging device will be described below.

When the mixture of fuel and air is drawn into the cylinder 10, the spark 20 will be supplied with a high voltage current through the high voltage line 21 of the igniting coil 22 such that the mixture within the cylinder 10 will be ignited by a spark generated by a spark plug. When the mixture is ignited, the piston 11 will be pushed downward and the linear movement of the piston 11 will be transferred into a rotational movement by means of the crankshaft. The frequency of the power supplying from the igniting coil 22 will be increased as the throttle of the vehicle increases, i.e. the movement of the piston 11 will be also increased proportionally. Besides, the spark generated by the plug is also increased, and the exhaust is also considerably increased. In this case, the rpm of the propeller 53 of the compulsory discharging device is also increased proportionally to the opening of the throttle. That is, as a signal coil 57 is wound onto the high voltage line 21, the variation of current transmitted by the high voltage line 21 can be readily detected by the signal coil 57 of the digital controller 56. The detected signal will then be used to control the rpm of the driving motor 50 by the digital controller 56. When the rpm of the driving motor 50 increases, the speed of the propeller 53 and a mixing propeller 54 is also increased and the withdrawing force generated by the propeller 53 and the mixing propeller 54 is also increased. By this arrangement, the digital controller 56 may readily pick up the variation of the high voltage line 21 of the igniting coil 22 for controlling the rpm of the driving motor 50. Accordingly, the withdrawing force is perfectly proportional to the rpm of the engine, i.e. when the rpm of the engine increases, the rpm of the driving motor 50 is also increased to withdraw the large amount of exhaust generated by the engine. In light of this, no matter the engine is operated at any rpm, the driving motor 50 is actively controlled to pace it and the smoothness of the engine is therefore kept in a steady condition.

As shown in FIGS. 2 and 3, the driving motor 50 of the digital controller 56 is mounted onto the exhaust pipe assembly. The exhaust pipe assembly includes a connecting bracket 41, an elbow 44 and a composite outlet 40. The composite outlet 40 is connected at the end pipe 45 of the elbow 44. The composite outlet 40 further includes a discharging pipe 46 which has a larger diameter than the end pipe 45. The driving motor 50 is installed externally of the end pipe 45 and the output shaft of the driving motor 50 is extended into the center of the end pipe 45 and the discharging pipe 46. The output shaft of the driving motor 50 is coaxially and fixedly mounted with a propeller 53 and a mixing propeller 54 which are located within the end pipe 45 and the discharging pipe 46 respectively. There is an opening 47 at the connection between the discharging pipe 46 and the end pipe 45. When the propeller 53 is rotated, the exhaust within the end pipe 45, the elbow 44 and the exhaust 30 is directly withdrawn by the propeller 53. Since the mixing propeller 54 is located within the discharging pipe 46 it covers both the opening of the end pipe 45 and the opening 47 between the discharging pipe 46 and the end pipe 45. By this arrangement, the exhaust from the end pipe 45 will be effectively withdrawn, but it will be mixed with the fresh air from the opening 47 between the discharging pipe 46 and the end pipe 45, as shown in FIG. 3. Accordingly, the exhaust is diluted by the exhaust. By this arrangement, the concentration of the exhaust from the exhaust pipe will be diluted while it is discharged. The pollution of the exhaust is also reduced.

The elbow 44 is provided with a ball-head connector 43 which can be engaged with the ball-head socket 42 of the connecting bracket 41. When the mounting angle of the elbow 44 is properly arranged, the elbow 44 can be fixed by means of locking screws. By this arrangement, the elbow 44 and the connecting bracket 41 are suitably interconnected. The driving motor 50 is fixedly mounted at a mounting bracket 51 which is located at the tail portion of the end pipe 45 such that the output shaft of the driving motor 50 extends into the end pipe 45.

From FIGS. 1 to 3, it can be readily appreciated that the discharging device is mounted at the outlet 33 of the muffler 32. The excess length of the outlet can be cut off. Firstly, the connecting bracket 41 is locked at the tail portion of the muffler 32 such that the ball-head socket 42 is aligned with the exhaust outlet 31. Then the elbow 44 is attached to the ball-head socket 42 of the connecting bracket 42 by means of the ball-head 43 such that the exhaust from the muffler 30 is directed into the elbow 44 after it passes through the muffler 32. Finally, the exhaust will be withdrawn by the propeller 53 and the mixing propeller 54.

By the provision of the compulsory discharging device made according to the present invention, the exhaust pipe will have a negative pressure when the propeller and mixing propeller are operated. On the other hand, the negative pressure can be properly remained constant even when the exhaust from the engine increases because the rpm of the propeller and the mixing propeller is proportionally controlled by the digital controller respect to the rpm of the engine. While the exhaust within the cylinder is completely expelled during the discharging cycle, the fresh mixture of fuel and air can be drawn into the cylinder without the residue of the exhaust therein. As the complete mixture is ignited by the spark, the mixture can be completely combusted such that the performance of the engine is increased. The engine is also benefited with improved smoothness of discharging exhaust, the residue of carbon can be also reduced. As a result, the power of the engine is also increased.

On the other hand, before the exhaust is discharged, the fresh air is also drawn in by the mixing propeller from the opening to dilute the concentration of the exhaust at the composite outlet 40. The odor and the pollution of the exhaust is therefore reduced.

While particular embodiment of the present invention has been illustrated and described, it would be obvious to those skilled in the art that various other changes and modifications can be made without departing from the spirit and scope of the invention. It is therefore intended to cover in the appended claims all such changes and modifications that are within the scope of the present invention.

I claim:

1. A compulsory discharging device for an exhaust system of a vehicle including an exhaust pipe and a muffler, the discharging device having a driving motor driving a propeller mounted at an end portion of the exhaust pipe such that the exhaust within said exhaust pipe is compulsorily discharged, and comprising an output shaft of said driving motor fixedly mounted with the propeller located at the end portion of said exhaust pipe, said driving motor being powered by the power from a battery, wherein the power from said battery is controlled by a digital controller which uses a signal line to pick up a frequency of a high voltage line of an igniting coil, wherein the rpm of said driving motor is proportionally controlled with respect to the rpm of an engine of the vehicle, such that the withdrawing force generated by said propeller is proportional to the rpm of said engine to compulsorily discharge the exhaust, wherein said driving motor and said propeller are mounted to an elbow which is fixedly attached externally of the muffler of the exhaust pipe by means of a connecting bracket such that an inlet of said elbow is aligned with an exhaust outlet, wherein the exhaust can be withdrawn from an outlet of said elbow by said propeller and discharged out of said exhaust pipe.

2. The compulsory discharging device for an exhaust system of a vehicle as recited in claim 1, wherein said elbow has an end portion and is connected with a discharging pipe which has larger diameter than the end portion of said elbow to form an opening between said end portion of said elbow and said discharging pipe, whereby the output shaft of said driving motor extends into said end portion of said elbow, said propeller being disposed within said end portion and further comprising a mixing propeller fixedly disposed on said output shaft of said driving motor and located within said discharging pipe, wherein when said driving motor is rotated, said exhaust is withdrawn by said propeller, then mixed with fresh air from said opening and then discharged by said mixing propeller.

3. The compulsory discharging device for an exhaust system of a vehicle as recited in claim 2 wherein a connection between said elbow and said exhaust system comprises: a connecting bracket having a first part of a ball and socket joint and connected to the exhaust system; and a second part of the ball and socket joint on said elbow and engaged with the first part such that said elbow can be angularly adjusted with respect to said connecting bracket.

4. The compulsory discharging device for an exhaust system of a vehicle as recited in claim 3 wherein the connecting bracket is connected to the muffler.

* * * * *